United States Patent [19]

Horibe

[11] Patent Number: 5,357,290
[45] Date of Patent: Oct. 18, 1994

[54] LIQUID CRYSTAL DISPLAYING APPARATUS CAPABLE OF RECEIVING TELEVISION SIGNALS THAT DIFFER IN BROADCASTING FORMAT

[75] Inventor: Shigenobu Horibe, Saitama, Japan

[73] Assignee: Kabushiki Kaisha Toshiba, Kawasaki, Japan

[21] Appl. No.: 946,637

[22] Filed: Sep. 18, 1992

[30] Foreign Application Priority Data

Sep. 25, 1991 [JP] Japan .................. 3-246085

[51] Int. Cl.⁵ ............................. H04N 3/12; H04N 5/66
[52] U.S. Cl. ......................... 348/792; 348/793; 348/556; 348/555; 395/100
[58] Field of Search ............... 358/230, 241, 59, 140, 358/11, 236, 240; 340/784; 359/54, 55, 58, 793, 792, 790, 791, 800, 801, 802, 803, 751, 766, 173, 443, 441, 445, 458, 555, 556, 564; 345/98–100, 103; H04N 3/12, 3/14, 5/66

[56] References Cited

U.S. PATENT DOCUMENTS

| 4,824,212 | 4/1989 | Taniguchi ............... 340/784 E |
| 5,003,388 | 3/1991 | Shirochi et al. ............... 358/140 |
| 5,227,882 | 7/1993 | Kato ............... 358/241 X |

FOREIGN PATENT DOCUMENTS

| 63-169884 | 7/1988 | Japan ............... H04N 5/66 |
| 1-286588 | 11/1989 | Japan ............... H04N 5/66 |
| 2-143781 | 6/1990 | Japan ............... H04N 5/66 |
| 3-131182 | 6/1991 | Japan ............... H04N 5/66 |
| 2260058 | 3/1993 | United Kingdom ........... H04N 3/12 |

Primary Examiner—James J. Groody
Assistant Examiner—Safet Metjahic
Attorney, Agent, or Firm—Cushman, Darby & Cushman

[57] ABSTRACT

A liquid crystal displaying panel is formed of a number of pixels in the horizontal and vertical directions based on a PAL system of many horizontal scanning lines. A polarity reversing circuit reverses the polarity of an input video signal at a predetermined period and a signal feeding circuit samples the video signal reversed in the polarity and holds it. The signal feeding circuit feeds the output to the respective data lines of the liquid crystal panel and can feed the output corresponding to the data lines of an NTSC video displaying region by a switch to the data lines corresponding to the blank part other than the NTSC system video displaying region. A scanning circuit feeds a driving signal to the respective gate lines of the liquid crystal displaying panel and can feed the output corresponding to the gate lines of the NTSC video displaying region by a switch so that, when the NTSC system is selected, an intrinsic NTSC video will be displayed in the displaying region and the NTSC video will be displayed also in the blank part. That is to say, by alternately driving the liquid crystal of all the pixels, a video of the same picture quality can be displayed in the PAL system and NTSC system without deteriorating the liquid crystal.

8 Claims, 6 Drawing Sheets

LIQUID CRYSTAL DISPLAYING APPARATUS CAPABLE OF RECEIVING TELEVISION SIGNALS THAT DIFFER IN BROADCASTING FORMAT

BACKGROUND OF THE INVENTION

1. Field of the Invention

This invention relates to a transmitting type liquid crystal displaying apparatus of a multi-system displaying television video of a plurality of systems that can differ in the number of horizontal scanning lines contained in the video.

2. Related Art Statement

A multi-system television receiver which can receive a plurality of television broadcasts which differ in the broadcasting system used is already known. Various standards are provided for the broadcasting system and are classified, for example, into a PAL system, SECAM system and NTSC system by the difference in the color broadcasting system. The PAL system and NTSC system differ from each other in the number of horizontal scanning lines. The number of horizontal scanning lines per field is 625 lines/2=312.5 lines in the PAL system and is 525 lines/2=262.5 lines in the NTSC system. For the multi-system television receiver receiving television signals of both PAL and NTSC systems, there is known a liquid crystal television receiver using, for example, a transmitting type liquid crystal displaying panel in the displaying part.

The liquid crystal displaying panel is formed of a pair of glass plates sealed with a liquid crystal between them pixel electrodes are formed like a matrix on one glass plate and common electrodes are formed on the other glass plate. Pixels are formed in the positions of the pixel electrodes. In an active matrix system, TFT's (Thin Film Transistors) are formed in the respective pixels, the gates of the respective TFT's are connected to respective gate lines wired in the horizontal direction of the panel, the drains are connected to respective data lines wired in the vertical direction of the panel and the sources are connected to the pixel electrodes. The TFT's are switched on by a gate signal (mentioned also as a Y driving signal hereinafter) at a high level (mentioned also as "H" hereinafter) fed to the respective gate lines and pass video signals fed through data lines to pixel electrodes so that a twisted nematic liquid crystal between the pixel electrodes and common electrodes may be driven, the light transmittivity may be controlled and videos may be displayed.

Now, as described above, the NTSC system and PAL system differ from each other in the number of horizontal scanning lines. However, in the case where both of these systems are made displayable, it is possible to use a liquid crystal displaying panel, which corresponds to the number of horizontal scanning lines, for example, of the PAL system. However, in case videos of the NTSC system are displayed in this liquid crystal displaying panel, a blank part in which no video is displayed will be produced in a part of the display. FIG. 6 is an explanatory view of the related art.

The number YP of pixels in the vertical direction of a liquid crystal displaying panel 71 is based on the number of scanning lines of the PAL system but on the other hand the number YN of pixels in the vertical direction required to display videos of the NTSC system is YN=-{YP—(312.5-262.5)}=YP—50 pixels. Also, if the number of pixels in the horizontal direction corresponding to the video of the PAL system is represented by XP, the number XN of pixels in the horizontal direction of the NTSC system will be XN=YN XP/YP. That is to say, if the video of the PAL system is to be displayed in the entire region of the liquid crystal displaying panel 71, the video of the NTSC system will be displayed in a region 72 and a vacant region (blank part) 73 will be produced and will occupy about 16% in the horizontal direction and about 50 lines in the vertical direction of the display.

When a video signal of the NTSC system is received, the respective pixels of this vacant region 73 will not be fed with the video signal, will be non-loaded and will be impressed with 0 potential or a direct current voltage (mentioned as a DC voltage hereinafter) on a predetermined level. For ease in visualizing the drawing, a predetermined black level will be applied to the respective pixels of the vacant region 73. However, if a DC voltage is applied to the liquid crystal for a long time, the liquid crystal molecules will deteriorate and will no longer have a rotary polarization corresponding to the impressed voltage. In case 0 potential is applied to the respective pixels of the vacant region 73, the deterioration of the liquid crystal molecules will be so much different between the vacant region 73 and the region 72 that the boundary between the regions 72 and 73 will be conspicuous.

For this reason, in a liquid crystal television receiver of a multi-system displaying videos of the PAL system and NTSC system, the number of pixels of the liquid crystal displaying panel has been set on the basis of the number of horizontal scanning lines of the NTSC system. In the video of the PAL system, the horizontal scanning lines are thinned at a rate of one out of 6 to 8 lines. That is to say, the horizontal scanning lines of the PAL system are thinned by about 50 lines so as to coincide with the number of horizontal scanning lines of the NTSC system so that the video of either of the NTSC system and PAL system may be displayed in the entire displaying region of the liquid crystal panel.

FIG. 7 is a block diagram showing a related art of a liquid crystal displaying apparatus 81 adopted in such a multi-liquid crystal television receiver.

The number of vertical direction pixels of a liquid crystal displaying panel 83 is set on the basis of the number of vertical effective scanning lines of the NTSC system and the number of horizontal direction pixels is limited by the capacity of a drive integrated circuit. Today, for a 4-inch size liquid crystal displaying panel, there are known displays having vertical 234×horizontal 479 pixels or vertical 220×horizontal 480 pixels. In the liquid crystal panel 83, gate lines (not illustrated) are wired in the horizontal direction, data lines (not illustrated) are wired in the vertical direction and pixels are formed at the intersections of these gate lines and data lines. The respective gate lines are serially fed with driving signals from Y drivers 87 and the data lines are fed with video signals from X drivers 88. The liquid crystal displaying panel 83, Y drivers 87 and X drivers 88 are controlled by a controlling circuit 82. By the way, the X drivers 88 and controlling circuit 82 are fed with a power source voltage through a terminal 86.

A compound synchronizing signal and NTSC/PAL switching signal are given to the controlling circuit 82 respectively through input terminals 84 and 85. The controlling circuit 82 makes a Y driving signal and X driving signal respectively on the basis of the compound synchronizing signal and NTSC/PAL switching signal and feeds them respectively to Y drivers 87 and X drivers 88. A common electrode driving signal generating circuit 89 is controlled by the controlling circuit 82 and generates a common voltage to be applied to the common electrodes of the liquid crystal panel 83 from the common electrode driving signal from a terminal 90. The controlling circuit 82 also makes an internal horizontal synchronizing signal and internal vertical synchronizing signal. On the basis of these internal horizontal and vertical synchronizing signals, by a polarity reversing circuit (not illustrated), the video signal is reversed, for example, at intervals of one horizontal period or vertical period and is input into an input terminal 93. A Y driver power source circuit 92 is fed with a Y driver power source voltage from a terminal 91 and generates a power source voltage to be fed to the Y drivers 87.

The video signal input through an input terminal 93 is fed to the X drivers 88 which sample the video signal from the input terminal 93 in a sampling period based on the controlling signal from the controlling circuit 82 and hold pixel data for one line of the liquid crystal displaying panel 83. That is to say, the NTSC system and PAL system are differ from each other in the sampling frequency. In the X driver 88, in case a video signal of either of the PAL system and NTSC system is input, the same number of pixel data will be sampled in one horizontal period. On the other hand, in the Y driver 87, on the basis of the Y driving signal from the controlling circuit 82, as synchronized with one horizontal period of the video signal, the gate lines of the liquid crystal displaying panel 83 will be sequentially switched on.

Now, a video signal of the NTSC system shall be displayed. On the basis of an NTSC/PAL switching signal from the terminal 85, the controlling circuit 82 sets the sampling frequency of the X driver 88 and controls the scanning of the Y driver 87 so that the Y driver 87 may shift the driving signal, for example, in one horizontal period and may switch on all the gate lines in one vertical scanning period. From the X driver 88, the pixel data of the respective lines are output to the data lines and, within one vertical scanning period, all the pixels of the liquid crystal displaying panel 83 are written in.

On the other hand, the video signal of the PAL system shall be displayed. The controlling circuit 82 varies the sampling frequency of the X driver 88 which holds the video data for the number of pixels of one line of the liquid crystal displaying panel 83 within one horizontal period. The Y driver 87 is controlled by the controlling circuit 82 and does not shift but switches off the driving signal only once within 6 to 8 horizontal periods and the video is not written in for only one horizontal period of every 6 to 8 horizontal periods. That is to say, in the PAL system, the horizontal scanning lines are thinned at a rate of one line out of 6 to 8 lines and the picture is compressed in the vertical direction. After all, about 50 lines are removed in one vertical scanning period and, the same as the video of the NTSC system, the video of the PAL system is also displayed in the same displaying region (entire region).

However, in this displaying system, as the horizontal scanning lines are thinned in the PAL system, the transmittivity of the PAL system is lower than of the NTSC system and the picture quality deteriorates in the PAL system reception.

OBJECTS AND SUMMARY OF THE INVENTION

An object of the present invention is to provide a liquid crystal displaying apparatus which can display in the same picture quality a plurality of television videos the differ in the number of horizontal scanning lines.

Another object of the present invention is to provide a liquid crystal displaying apparatus wherein, even if a plurality of television videos different in number of horizontal scanning lines are displayed, the liquid crystal will not be non-uniformly deteriorated, thus making the display difficult to see.

Another object of the present invention is to provide a liquid crystal displaying apparatus wherein, in the case where a plurality of television videos that differ in the number of horizontal scanning lines are displayed, the liquid crystal is prevented, by a very simple circuit formation, from suffering non-uniform deterioration.

A liquid crystal displaying apparatus of the present invention comprises a liquid crystal displaying means with pixels formed at respective intersections of a plurality of data lines and a plurality of scanning lines and having a number of pixels corresponding to the first television signal of the largest number of scanning lines among the plurality of television signals; a liquid crystal driving means feeding scanning signals to the respective scanning lines of the liquid crystal displaying means in response to the received television signals, feeding the television video information and reversing the polarity at a predetermined period to the respective data lines, making a display in the first region of the liquid crystal displaying means at the time of receiving the first television signal and making a display in the second region narrower than the first region at the time of receiving another television signal; and a blank part displaying means making a display by feeding information by a predetermined alternating signal to the pixels corresponding to the part of the difference between the first and second regions at the time of receiving the other television signal. The other features and advantages of the present invention will become apparent enough with reference to the following description in conjunction with the attached drawings.

DETAILED DESCRIPTION OF THE PREFERRED EMBODIMENTS

Figure 1:
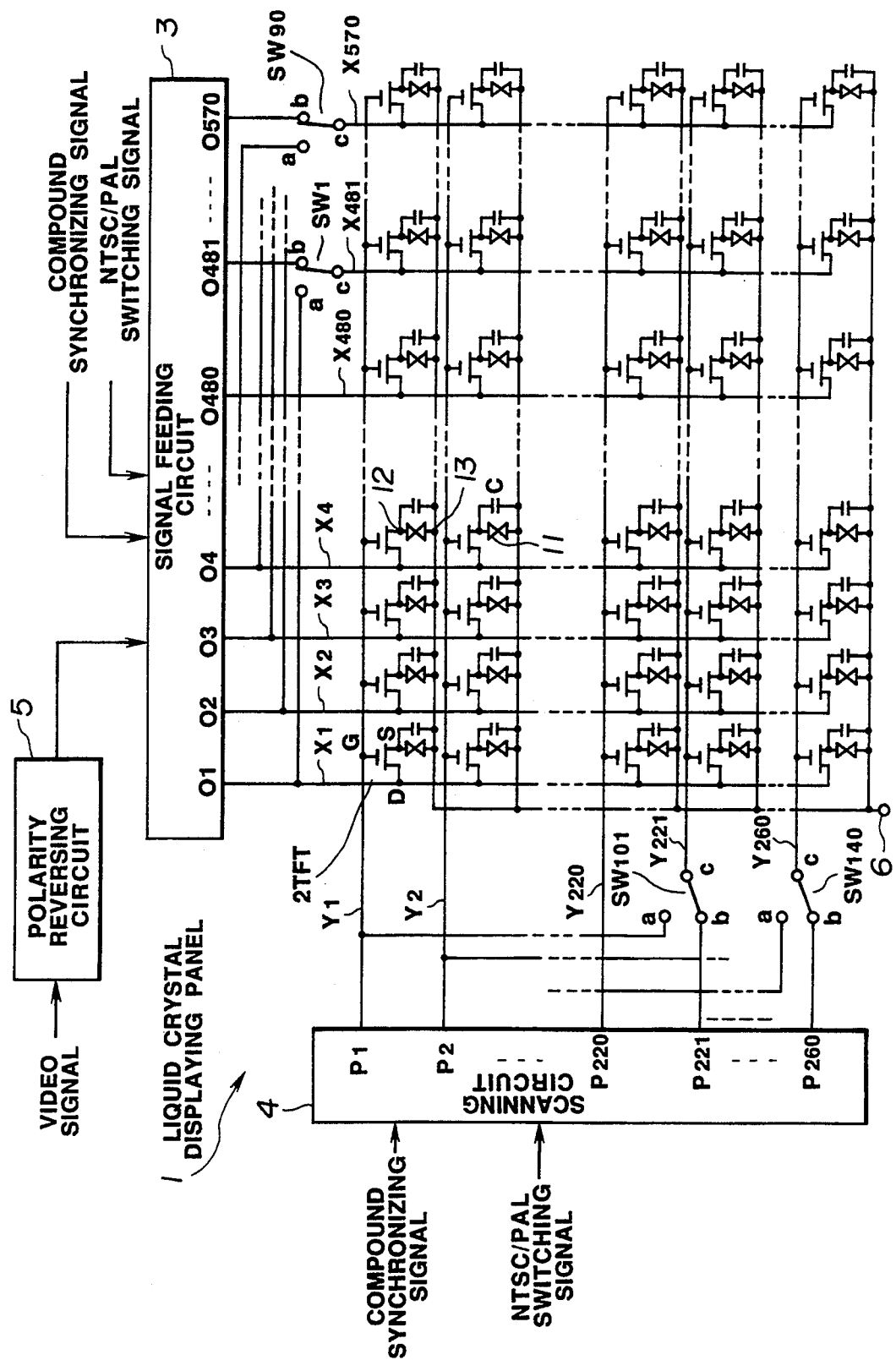
FIG. 1 is a formation diagram showing the first embodiment of a liquid crystal displaying apparatus of the present invention.

FIG. 1 is a formation diagram showing the first embodiment of a liquid crystal displaying apparatus of the present invention. This embodiment shows an example as applied to a multi-system liquid crystal television receiver.

In FIG. 1, a liquid crystal displaying panel 1 is of an active matrix system adopting a TFT 2 and has, for example, a twisted nematic liquid crystal 11 sealed between a pair of glass substrates not illustrated. One glass substrate is provided on the surface with pixel electrodes 12 like a matrix and the other glass substrate is provided on the surface with common electrodes 13. Pixels are formed in the positions of the matrix-like arranged pixel electrodes 12 and TFT's 2 are formed in the respective pixels. The liquid crystal displaying panel 1 has a number of data lines X1, X2 . . . corresponding to the number of pixels in the horizontal direction and a number of gate lines Y1, Y2, . . . corresponding to the number of pixels in the vertical direction. Drains D of the respective TFT's 2 in the row direction are connected to the data lines X1, X2, . . . gates G of the respective TFT's 2 in the line direction are connected to the gate lines Y1, Y2, . . . and sources S of the respective TFT's 2 are connected to the pixel electrodes 12. The TFT's 2 are switched on by a driving signal fed to the gate lines Y1, Y2, . . . and display pictures by driving the liquid crystal 11 of the respective pixels between the pixel electrodes 12 and common electrodes 13 by a video signal fed through the data lines X1, X2, . . . Additional capacitors C for keeping the pixel potential stable are connected between the pixel electrodes 12 and common electrodes 13. A common voltage is applied to the common electrodes 13 through a terminal 6.

In this embodiment, the number of pixels in the horizontal direction of the liquid crystal displaying panel 1 is 570 and the number of pixels in the vertical direction is 260. That is to say, the liquid crystal displaying panel 1 has 148200 pixels formed at the intersections of 570 data lines X1 to X570 and 260 gate lines Y1 to Y260.

A PAL system or NTSC system video signal is input into a polarity reversing circuit 5 which reverses the video signal in such predetermined period as, for example, a field period, frame period or horizontal scanning period and outputs it to a signal feeding circuit 3 to prevent the deterioration of the liquid crystal. A compound synchronizing signal and NTSC/PAL switching signal are also input into the signal feeding circuit 3 which has output ends O1 to O570 based on the number of pixels in the horizontal direction of the liquid crystal displaying panel and also has sample holding circuits corresponding to the respective output ends O1 to O570.

In the signal feeding circuit 3, at a horizontal scanning starting timing, the sample holding circuit corresponding to the output end O1 samples and holds a video signal and then the sampling operating sample holding circuits sequentially shift. This shifting frequency, that is, the sampling frequency is different depending on the system and the number of samples in one horizontal period which depends on the input video signal. That is to say, in the signal feeding circuit 3, in case an NTSC system video signal is input, the sample holding circuits corresponding respectively to the output ends O1 to O480 will hold the sample in one horizontal period and, in case a PAL system video signal is input, the sample holding circuits corresponding respectively to all the output ends O1 to O5270 will sample and hold the video signal in one horizontal period. The signal feeding circuit 3 outputs the held video signal from the respective output ends 01 to O570 at a predetermined timing.

In this embodiment, the respective output ends O1 to O480 of the signal feeding circuit 3 are connected respectively to the data lines X1 to X480 of the liquid crystal displaying panel 1 and the output ends O481 to O570 are connected respectively to the terminals b of the switches SW1 to SW90. The respective output ends O1 to O90 of the signal feeding circuit 3 are connected respectively to the terminals a of the switches SW1 to SW90. The terminals c of the switches SW1 to SW90 are connected respectively to the data lines X481 to X570 of the liquid crystal displaying panel 1 and the switches SW1 to SW90 will select the terminals a in case an NTSC system video signal is input and will select the terminals b in case a PAL system video signal is input.

A compound synchronizing signal and NTSC/PAL switching signal are fed to a scanning circuit 4 which has output ends P1 to P260 based on the number of pixels in the vertical direction of the liquid crystal displaying panel 1. The scanning circuit 4 will output a driving signal of "H" to the output end P1 when the vertical scanning is started and will shift the output ends outputting driving signals sequentially in the horizontal period of the video signal so that, in case an NTSC system video signal is input, the output ends P1 to P220 will be sequentially switched on in the horizontal period and, in case a PAL system video signal is input, the output ends P1 to P260 will be sequentially switched on in the horizontal period.

In this embodiment, the output ends P1 to P220 of the scanning circuit 4 are connected respectively to the gate lines Y1 to Y220 of the liquid crystal displaying panel and the output ends P221 to P260 are connected respectively to the terminals b of the switches SW101 to SW140. The terminals a of the switches SW101 to SW140 are connected respectively to the output ends P1 to P40 of the scanning circuit 4. The terminals c of the switches SW 101 to SW140 are connected respectively to the gate lines Y221 to Y260 of the liquid crystal displaying panel 1 and the switches SW101 to SW1401 will select the terminals a in case an NTSC system video signal is input and will select the terminals b in case a PAL system video signal is input.

Figure 2:
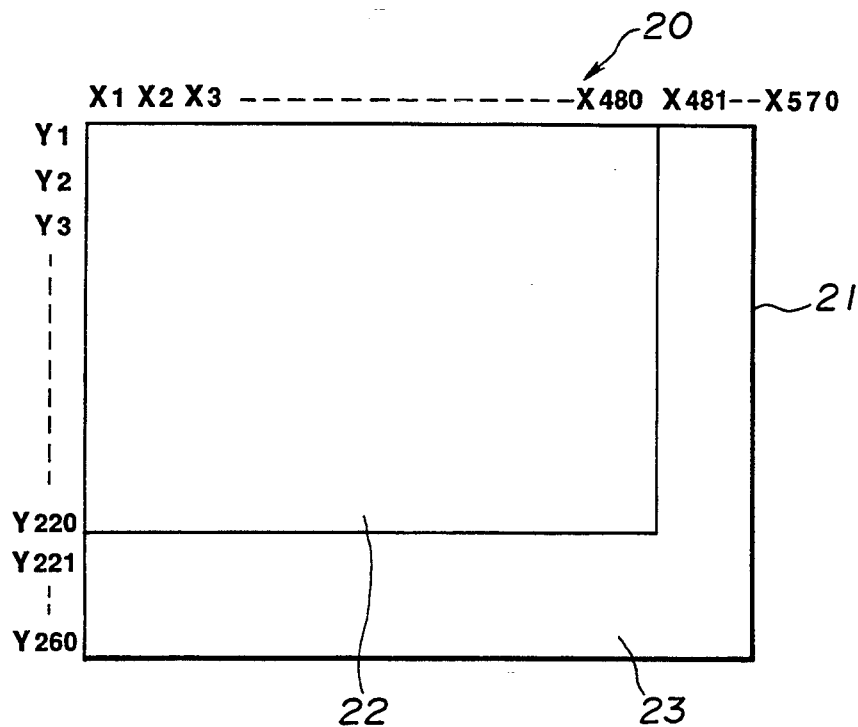
FIG. 2 is a view explaining the picture displayed in a PAL system of the liquid crystal displaying apparatus of FIG. 1.
Figure 3:
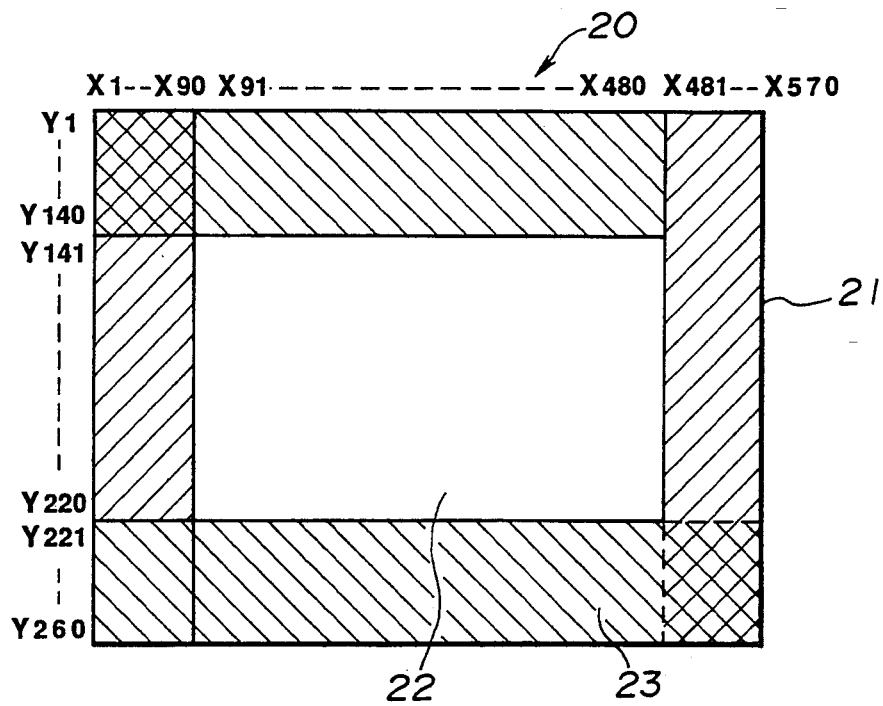
FIG. 3 is a view explaining the picture displayed in an NTSC system of the liquid crystal displaying apparatus of FIG. 1.

The operation of the thus formed embodiment shall be explained with reference to FIGS. 2 and 3. FIG. 2 explains the display of a PAL system video. FIG. 3 explains the display of an NTSC system video. In FIG. 3, the regions in which the same picture is displayed are shown by hatchings.

An NTSC system or PAL system video signal has the polarity reversed, for example, in a horizontal period by a polarity reversing circuit 5 and is input into the signal feeding circuit 3. Now, it is assumed that a PAL system television signal is received by a liquid crystal television receiver and a PAL video signal of 625 horizontal scanning lines is input into the signal feeding circuit 3. When it is shown that the PAL video signal is input by an NTSC/PAL switching signal, the signal feeding circuit 3 will sample the PAL video signal from the polarity reversing circuit 5 with a predetermined sampling frequency, will extract video data of 570 samples in one horizontal period and will hold them in sample holding circuits corresponding respectively to the output ends O1 to O570.

At the vertical scanning starting timing, the scanning circuit 4 will output a driving signal of "H" to the gate line Y1 from the output end P1 and, as coinciding with this timing, the signal feeding circuit 3 will output from the output ends O1 to O570 the video signal held by the sample holding circuit. In this case, the switches SW1 to SW90 will select the terminals b and the video signal from the output ends O1 to O570 will be fed to the data lines X1 to X570. The TFT's 2 of all the pixels of the first line of the liquid crystal displaying panel 1 will be switched on by the driving signal fed to the gate line Y1 and the video signal fed through the data lines X1 to X570 will be given to the respective pixel electrodes 12 so that the video signal may be written into liquid crystals 11 of the respective pixels of the first line and the rotary polarization may be controlled.

After one horizontal period, the output end P1 of the scanning circuit 4 will be on a low level (mentioned as "L" hereinafter), the output end P2 will be on "H" and the gate line Y2 of the liquid crystal displaying panel 1 will be on "H". The signal feeding circuit 3 will conform the already sampled and held video signal of the second horizontal period to the driving signal on "H" from the scanning circuit 4 and will output the video signal from the output ends O1 to O570 so that the video signal may be fed to the pixel electrodes 12 through the TFT's 2 of the second line connected to the gate line Y2 and may be simultaneously written into the liquid crystal of all the pixels of the second line.

In the same manner, the signal feeding circuit 3 repeats sampling and holding the video signal in the horizontal period and the scanning circuit 4 sequentially shifts in the horizontal period the terminals outputting the driving signal on "H". The signal feeding circuit 3 outputs from the output ends O1 to O570 the video signal held by the timing of the driving signal on "H" from the scanning circuit 4 and sequentially write the video signal into the liquid crystal of the respective lines. At the time of inputting the PAL video signal, the switches SW101 to SW140 will select the terminals b. Therefore, the gate lines Y1 to Y260 of the liquid crystal displaying panel 1 will be on "H" in the horizontal period and the PAL video signal will be written into the liquid crystal 11 of all the pixels of the liquid crystal displaying panel 1 in one vertical period. Depending on the capacity of the liquid crystal 11 and the additional capacity C, the written video signal will be held until the writing in the next vertical period and the video will be displayed.

Therefore, on the displayed picture 20 (See FIG. 2) of the liquid crystal displaying panel 1, a PAL video will be displayed in the entire region 21. In this case, the scanning lines will not be thinned and a favorable picture quality will be obtained. The region 22 in FIG. 2 shows a displaying region corresponding to the pixels formed at the intersections of the data lines X1 to X480 and gate lines Y1 to Y220 on the liquid crystal displaying panel 1 in FIG. 2. Also, the region 23 shows a displaying region corresponding to the pixels formed at the intersections of the data lines X481 to X570 and gate lines Y221 to Y260 on the liquid crystal displaying panel 1.

In this embodiment, the writing in is made also in even number fields the same as in odd number fields but the polarity reversing circuit 5 reverses the video signal in the odd number fields and even number fields so that no video signal of the same polarity in the even number fields and odd number fields may be fed to the pixels of the same line and the deterioration of the liquid crystal may be prevented.

Then, in a liquid crystal television receiver, an NTSC system television signal is to be received. An NTSC video signal reversed in the polarity, for example, in a horizontal period through the polarity reversing circuit 5 is input into the signal feeding circuit 3. When it is shown that the NTSC video signal has been input by an NTSC/PAL switching signal, the signal feeding circuit 3 will sample the NTSC video signal from the polarity reversing circuit 5 with a predetermined sampling frequency, will extract video data of 480 samples in one horizontal period and will hold them in the sample holding circuits corresponding respectively to the output ends O1 to O480. On the other hand, the scanning circuit 4 will be fed with a compound synchronizing signal separated from the NTSC video signal and will sequentially shift the output ends making "H" in a horizontal period. That is to say, the scanning circuit 4 will output a driving signal of "H" to the gate line Y1 from the output end P1 at a vertical scanning starting timing. The signal feeding circuit 3 will output the video signal held by the sample holding circuit from the output ends O1 to O480 at the timing of the driving signal of the scanning circuit 4.

The video signal from the output ends O1 to O480 of the signal feeding circuit 3 is fed respectively to the data lines X1 to X480 of the liquid crystal displaying panel 1. In this embodiment, when the NTSC video signal is input, the switches SW1 to SW90 and SW101 to SW140 will select terminals a. Therefore, the video signal from the terminals O1 to O90 will be fed also to the data lines X481 to X570 respectively through the switches SW1 to SW90. Also, as the switch SW101 has selected the terminal a, the driving signal "H" from the output P1 of the scanning circuit 4 will be fed also to the gate line Y221 of the liquid crystal displaying panel 1. That is to say, in the "H" period of the output end P1, the TFT's 2 of the pixels of the two lines of the lines 1 and 221 will be on, the video signal from the output ends O1 to O480 of the signal feeding circuit 3 will be written into the pixels of the rows 1 to 480 and the video signal from the output ends O1 to O90 will be written into the pixels of the rows 481 to 570.

After one horizontal period, when the output end P2 of the scanning circuit 4 is on "H", the TFT's 2 of the two lines connected to the two gate lines Y2 and Y222 will be on. From the signal feeding circuit 3, the video signal of 480 samples of the second horizontal period is output respectively from the output ends O1 to O480. Thus, the sampling video data of the second horizontal period are written into the pixels of the rows 1 to 480 of the line 2 of the liquid crystal displaying panel 1, also into the pixels of the rows 1 to 480 of the line 222 and into the pixels of the rows 481 to 570 of the lines 2 and 222.

Thereafter, the same operation is repeated, the video signal is written into the pixels of the lines 223 to 260 of the liquid crystal displaying panel 1 at the same timing respectively as into the pixels of the lines 3 to 140 and the video signal from the output ends O1 to O90 of the signal feeding circuit 3 is fed respectively to the pixels of the rows 481 to 570 of the liquid crystal displaying panel 1. That is to say, as shown in FIG. 3, the sampling video data (left hatching) of the horizontal periods 1 to 140 are written into the lines 1 to 140 of the liquid crystal panel 1 and also into the lines 221 to 260. The same signal as the video signal (right hatching) of the rows 1 to 90 is written into the pixels of the rows 481 to 570 to which the video signal is not intrinsically fed as the number of samples is not sufficient. By the way, the same signal as the video signal (net lines) of the rows 1 to 90 of the lines 1 to 140 is written into the pixels formed at the intersections of the data lines X481 to X570 and the gate lines Y221 to Y260.

That is to say, in case an NTSC system video is to be displayed, an intrinsic NTSC video will be displayed in the region 22 corresponding to 105600 pixels formed by the data lines X1 to X480 and gate lines Y1 to Y220 and also an NTSC video signal from the signal feeding circuit 3 will be fed and displayed in the region (blank part) 23 which is intrinsically blank. That is to say, in the entire region 21 consisting of the regions 22 and 23, the video signal treated to reverse the polarity will be written into the liquid crystal 11 and the deterioration of the liquid crystal 11 will be prevented. Also, as the video is displayed by the video signal in either of the regions 22 and 23, no difference of the deterioration of the liquid crystal 11 in the regions 22 and 23 will be produced and the boundary will not be conspicuous.

By the way, the same operation as in odd number fields is made in even number fields. Also, it is the same as in receiving a PAL video signal that the polarity reversing circuit 5 reverses the polarity of the video signal in the even number fields and odd number fields.

As the intrinsic NTSC video of the region 22 is made hard to see by the display of the region 23, when the NTSC broadcast is to be received, a mechanism masking the region 23 is desirable so that only the region 22 may be seen.

Thus, in this embodiment, the liquid crystal displaying panel 1 is set to be of a number of pixels based on the number of horizontal scanning lines of the PAL system so that the PAL video may be displayed in the entire region of the liquid crystal displaying panel 1 without thinning the scanning lines on the PAL system video signal. In the case of displaying an NTSC system video, the NTSC video will be displayed also in the region which is intrinsically blank from the difference in the number of scanning lines so that, even in case either of the PAL system and NTSC system is selected, the video signal may be fed to all the pixels of the liquid crystal displaying panel, the deterioration of the liquid crystal may be prevented and the boundary between the blank part and the intrinsic NTSC video displaying region may be prevented from being conspicuous. Also, as the PAL video signal is not thinned, both of the PAL video and NTSC video can maintain a favorable picture quality. Further, these effects can be obtained with a simple formation provided with only switches.

In the embodiment of FIG. 1, the same video signal as the video signal fed to the pixels of the rows 1 to 90 is written into the respective pixels of the rows 481 to 570 of the liquid crystal displaying panel 1 but it is apparent that, by properly connecting the terminals a of the switches SW1 to SW90 with the output ends O1 to O480 of the signal feeding circuit 3, the same video signal as the video signal fed to predetermined 90 rows of the rows 1 to 480 may be written into the respective pixels of the rows 481 to 570 of the liquid crystal displaying panel 1. It is also apparent that, in the same manner, by properly setting the connection of the terminals a of the switches SW101 to SW140 with the output ends of the scanning circuit 4, the same driving signal as the driving signal fed to the pixels of predetermined 40 lines of the lines 1 to 220 may be written into the respective pixels of the lines 221 to 260 of the liquid crystal displaying panel 1.

Figure 4:
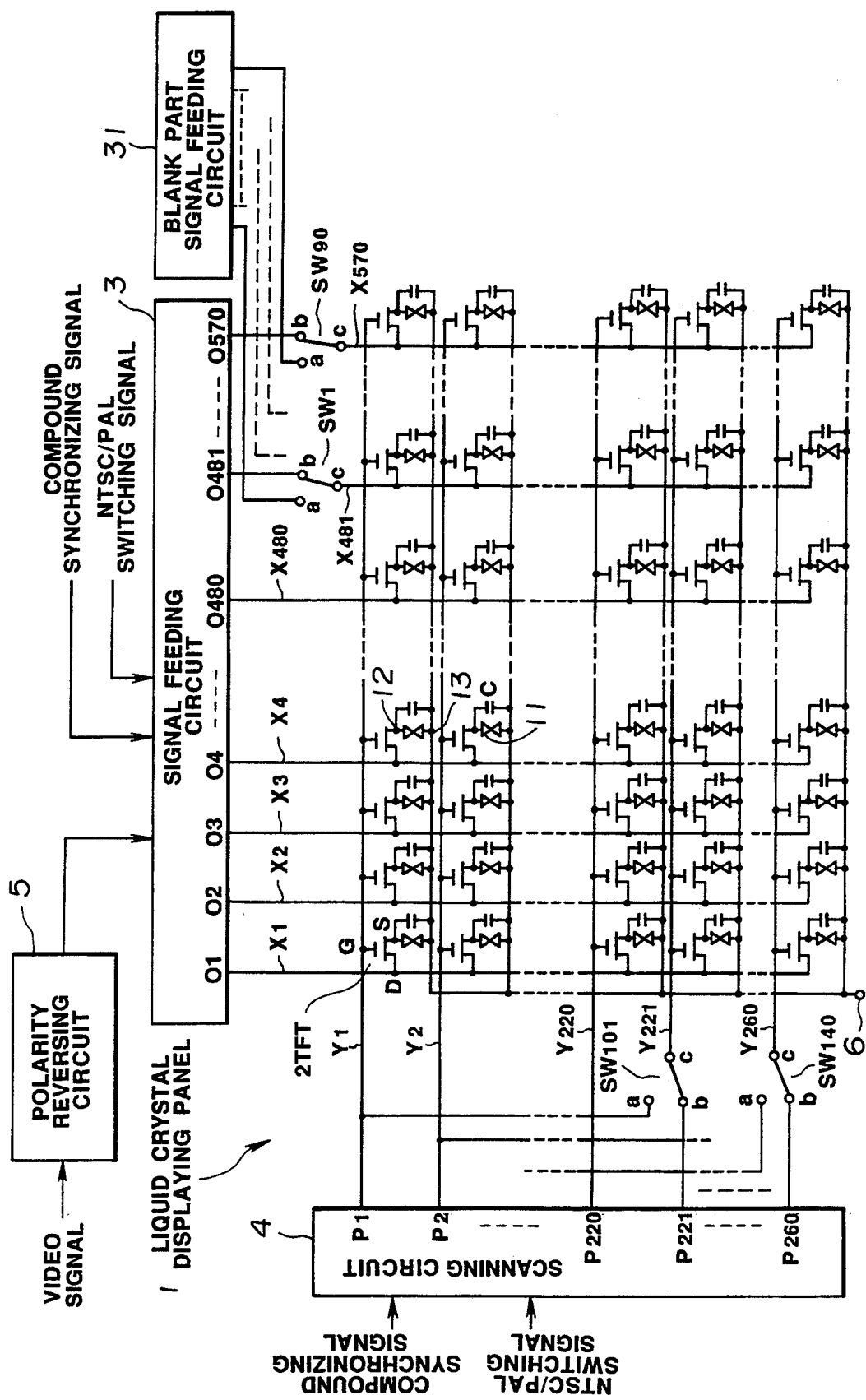
FIG. 4 is a formation diagram showing an embodiment of a liquid crystal displaying apparatus of the second embodiment of the present invention.

FIG. 4 is a formation diagram showing a liquid crystal displaying apparatus relating to the second embodiment of the present invention. In FIG. 4,, the same components as in FIG. 1 shall bear the same reference numerals and shall not be explained here.

This embodiment is different from the embodiment in FIG. 1 in that a blank part signal feeding circuit 31 is provided so that signals from the blank part signal feeding circuit 31 may be fed to the terminals a of the switches SW1 to SW90. The blank part signal feeding circuit 31 outputs 90 outputs corresponding to the switches SW1 to SW90. The respective outputs reverse in the polarity, for example, at 1 horizontal period and also reverse in the polarity in the even number fields and odd number fields. That is to say, the respective outputs are alternating signals and may be not only sinusoidal waves but also rectangular waves. The same as in the embodiment in FIG. 1, the switches SW1 to SW90 will select the terminal b when a PAL video signal is input and will select the terminal a when an NTSC video signal is input.

In the thus formed embodiment, when the NTSC system is selected, signals from the blank part signal feeding circuit 31 will be fed to the data lines X480 to X570 of the liquid crystal displaying panel 1. The output of the blank part signal feeding circuit 31 is an alternating signal, The same as when the video signal is written in, the liquid crystals 11 of the respective pixels will be prevented from being deteriorated. The other operations are the same as in the embodiment in FIG. 1.

In this embodiment, when the respective outputs of the blank part signal feeding circuit 31 are properly set, for example, the display of the blank part will be able to be made low in the luminance so that the display of the intrinsic NTSC video displaying region may be made easy to see. Also, there is an advantage that, when the levels of the respective outputs of the blank part signal feeding circuit 31 are varied at a predetermined period, the degree of the deterioration of the liquid crystal in the blank part and the degree of the deterioration of the liquid crystal in the intrinsic NTSC video displaying region will be able to be made to coincide with each other.

Figure 5:
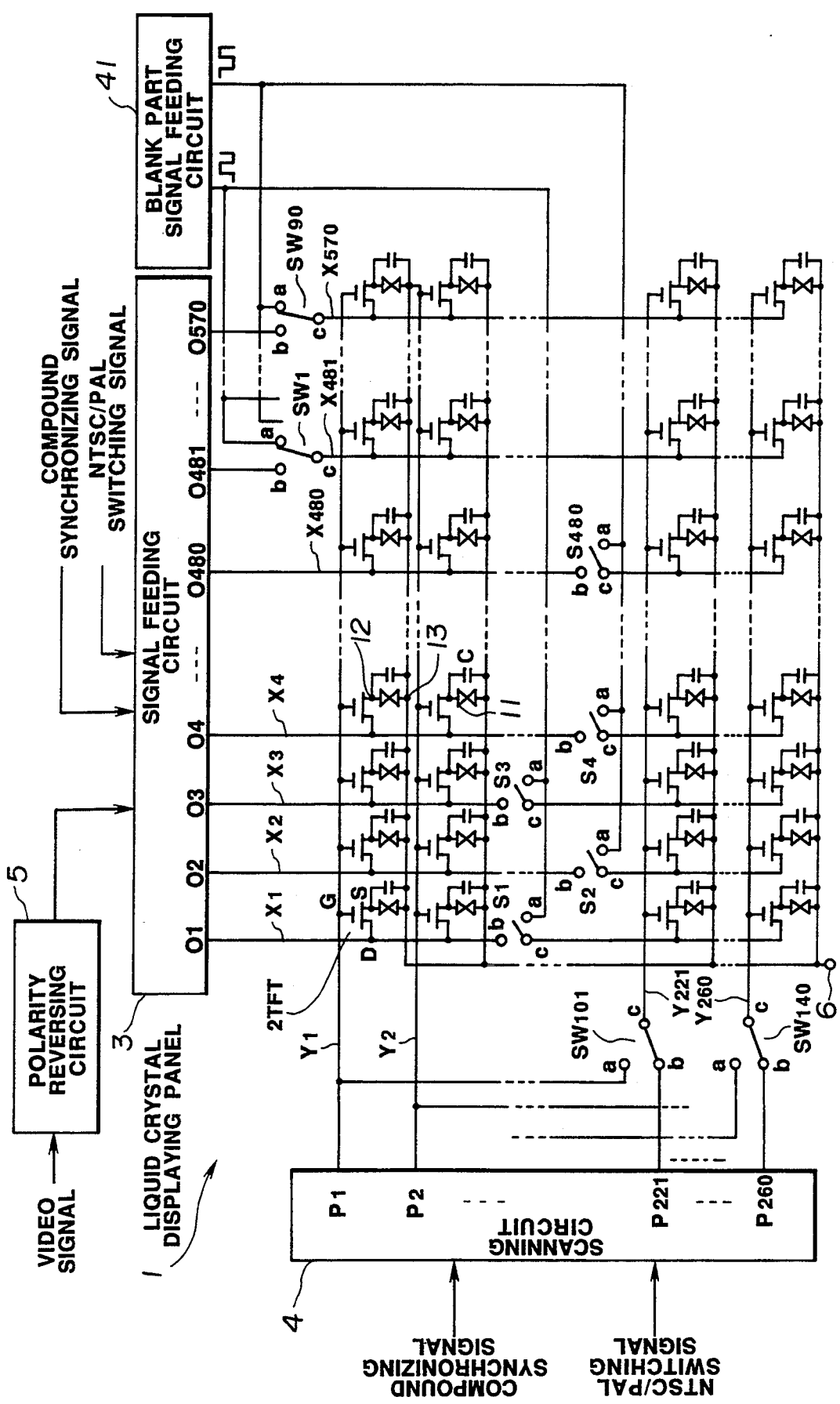
FIG. 5 is a formation view showing a modification of the second embodiment.
Figure 6:
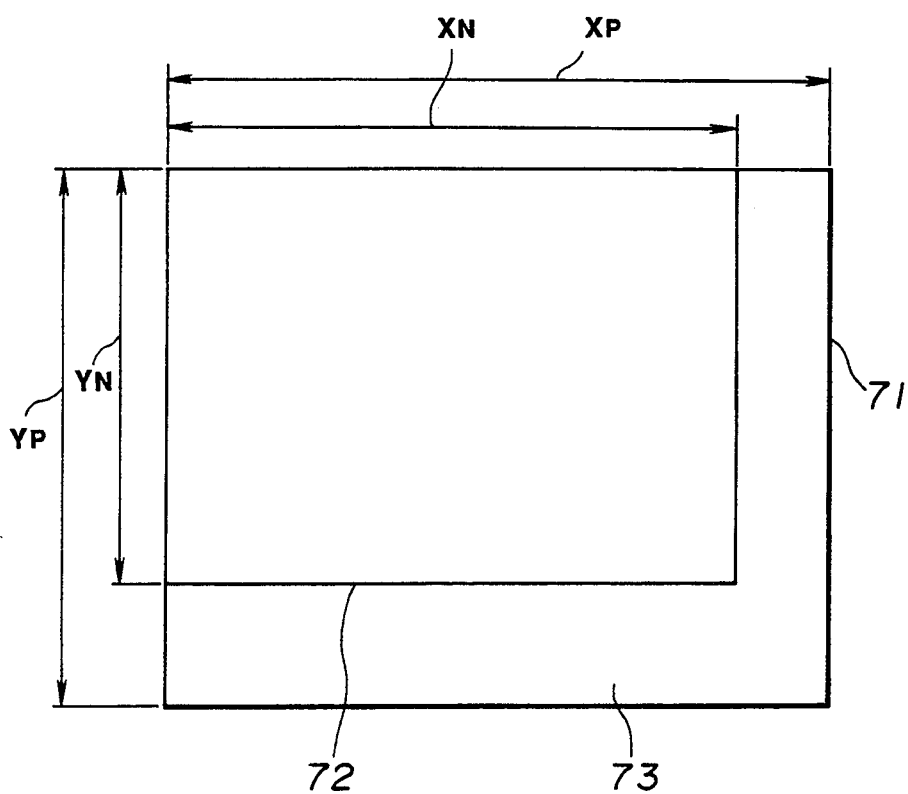
FIG. 6 is a view for explaining the difference of the picture displaying between the PAL system and NTSC system based on the difference in the number of scanning lines.
Figure 7:
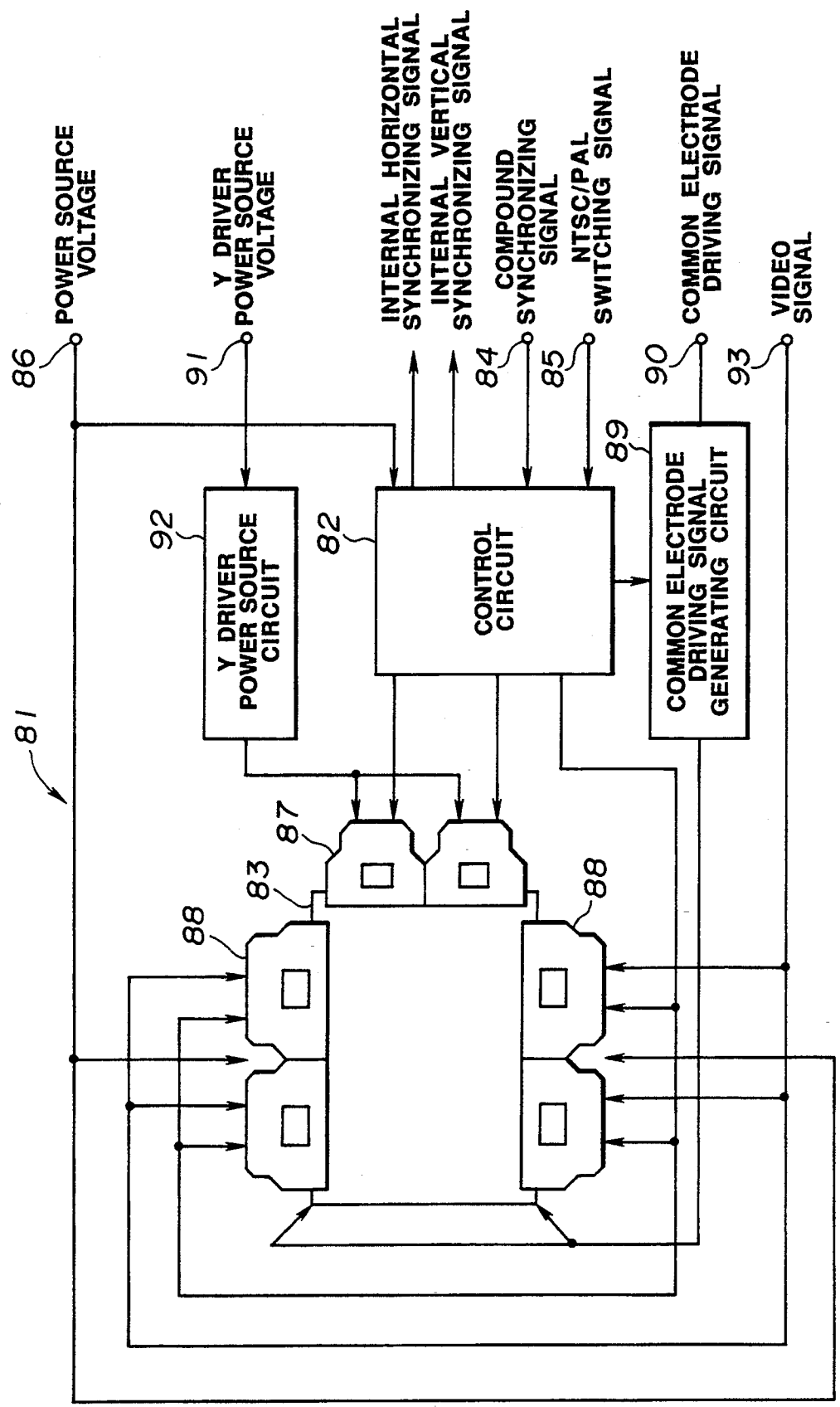
FIG. 7 is a block diagram showing an example of the related art of a liquid crystal displaying apparatus.

FIG. 5 is a formation view showing a modification of the liquid crystal displaying apparatus of the second embodiment. In FIG. 5, the same components as in FIG. 4 shall bear the same reference numerals and shall not be explained here.

A blank part feeding circuit 41 is used instead of the blank part signal feeding circuit 31. The blank part feeding circuit 41 can simultaneously output, for example, a rectangular wave of a positive polarity and a rectangular wave of a negative polarity. The blank part feeding circuit 41 gives positive polarity rectangular waves to the switches SW1, SW3 . . . and SW89 connected, for example, to the odd numbered data lines and gives negative polarity rectangular waves to the switches SW2, SW4, . . . and SW90 connected to the even numbered data lines. Further, in this embodiment, switches S1 to S480 are provided in the respective data lines X1 to X570 between the lines Nos. 220 and 221. Positive polarity rectangular waves from the blank part signal feeding circuit 41 are given to the terminals a of the switches S1, S3 . . . and S479 connected to the odd numbered data lines. Negative polarity rectangular waves from the blank part signal feeding circuit 41 are given to the terminals a of the switches S2, S4, . . . and S480 connected to the even numbered data lines. The switches S1 to S480 will select the terminals b and will feed the signals from the signal feeding circuit 3 to the respective pixels of the lines Nos. 221 to 260 in case the videos of the PAL system are displayed but will select the terminals a and will give the rectangular waves from the blank part signal feeding circuit 31 to the respective pixels of the lines Nos. 221 to 260 in case the videos of the PAL system are displayed.

In the thus formed embodiment, when the NTSC system is selected, the signals from the blank part signal feeding circuit 41 will be fed to the data lines X480 to X570 of the liquid crystal displaying panel 1 and the data lines X1 to X480 of the lines Nos. 221 to 260. The output of the blank part signal feeding circuit 41 is an alternating signal. Even at the time of displaying the NTSC system video, by feeding the alternating signal, the deterioration will be able to be prevented. The other operations are the same as in the embodiment in FIG. 1.

By the way, in the above mentioned respective embodiments, the transistors or the like may be used instead of the switches SW1 to SW90 and SW101 to SW140. The example of applying the present invention to the multi-system liquid crystal television receiver which can receive NTSC system and PAL system television signals has been explained but the invention may well be applied to television receivers which can receive such other combined television signals as of the SECAM system and NTSC system.

Also, the arrangement of pixels of the liquid crystal displaying panel, the method of sampling the signal feeding circuit 3 and the method of scanning the scanning circuit 4 are not limited to the embodiments. For example, the present invention may be applied to an apparatus wherein a liquid crystal displaying panel having the same number of 520 pixels in the vertical direction as the number of the effective scanning lines of the PAL system is used and the scanning circuit feeds a driving signal to all lines with one field. In short, an alternating signal may be fed to pixels which will be blank in case a video of a plurality of systems different in the number of scanning lines is to be displayed.

In the present invention, it is apparent that working modes different over a wide range can be formed on the basis of the present invention without deviating from the spirit and scope of the invention. The present invention is not restricted by its specific working modes except as limited by the appended claims.

What is claimed is:

1. A liquid crystal displaying apparatus capable of displaying a plurality of television signals having different numbers of scanning lines, comprising:
    a liquid crystal displaying means for forming pixels at respective intersections of a plurality of data lines and a plurality of scanning lines and having a number of pixels corresponding to a first television signal having the largest number of scanning lines among the plurality of television signals;
    a liquid crystal driving means for feeding scanning signals to the respective scanning lines of the liquid crystal displaying means in response to the received television signals, feeding television video information reversing polarity at a predetermined period to the respective data lines, making a display in a first region of the liquid crystal displaying means at the time of receiving the first television signal and making a display in a second region narrower than the first region at the time of receiving another television signal; and
    a blank part displaying means for making a display by feed information from a predetermined alternating signal and a part of the scanning signals used in a display in the second region to the pixels corresponding to the part of the difference between the first and second regions at the time of receiving the other television signal.

2. A liquid crystal displaying apparatus according to claim 1 wherein the blank part displaying means is a means for feeding a part of the television video information utilized for the display in the second region and a part of the scanning signals to the pixels corresponding to the part of the difference.

3. A liquid crystal displaying apparatus according to claim 1 wherein the blank part displaying means is a means for feeding information from a specific signal generating means and a part of the scanning signal used in a display in the second region to the pixels corresponding to the part of the difference.

4. A liquid crystal displaying apparatus capable of displaying a plurality of television signals having different numbers of scanning lines, comprising:
    a liquid crystal displaying means for forming pixels at respective intersections of a plurality of data lines and a plurality of scanning lines and having a number of pixels corresponding to a first television signal having the largest number of scanning lines among the plurality of television signals;
    a liquid crystal driving means for feeding scanning signals to respective scanning lines of the liquid crystal displaying means in response to the received television signals, feeding television video information reversing the polarity at a predetermined period to the respective data lines, making a display in the first region of the liquid crystal displaying means at the time of receiving the first television signal and making a display in the second region narrower than the first region at the time of receiving another television signal; and
    a blank part displaying means for making a display by feeding a part of television video information utilized for display in the second region and a second scanning signals to the pixels corresponding to the part of the difference between the first and second regions at the time of receiving the other television signal.

5. A liquid crystal displaying apparatus capable of displaying a first television signal having a number of first scanning lines and a second television signal having a number of second scanning lines smaller than the number of the first scanning lines, comprising:
    a liquid crystal displaying means for forming pixels at respective intersections of a plurality of data lines and a plurality of scanning lines and having a number of pixels corresponding to the first television signal; and
    a liquid crystal driving means;
    the liquid crystal driving means including:
    means for feeding scanning signals to the scanning lines of the respective pixels of a first region so as to make a display in the first region of the liquid crystal displaying means at the time of receiving the first television signal and feeding the video information from the first television signal to the data lines;

a means for feeding scanning signals to the scanning lines of the respective pixels of a second region so as to make a display in the second region which is narrower than the first region at the time of receiving the second television signal and feeding the video information by the second television signal to the data lines; and a means for feeding the second scanning signals to the scanning lines and feeding a part of video signals used in a display in the second region to the data lines of the respective pixels corresponding to the part of the difference between the first region and second region at the time of receiving the second television signal.

6. A liquid crystal displaying apparatus capable of displaying a first television signal having a first number of first scanning lines and a second television signal having a second number of second scanning lines, said second number being smaller than the first number, comprising:

a liquid crystal displaying means for forming pixels at respective intersections of a plurality of data lines and a plurality of scanning lines and having a number of pixels corresponding to the first television signal; and a liquid crystal driving means;

the liquid crystal driving means including:

a means for feeding scanning signals to the scanning lines of the respective pixels of a first region so as to make a display in the first region of the liquid crystal displaying means at the time of receiving the first television signal and feeding the video information of the first television signal to the data lines;

a means for feeding scanning signals to the scanning lines of the respective pixels of a second region so as to make a display in the second region which is narrower than that of the first region at the time of receiving the second television signal and feeding the video information of the second television signal to the data lines; and a means for feeding a part of the scanning signals utilized for the display in the second region to the scanning lines of the respective pixels corresponding to the part of the difference between the first region and second region at the time of receiving the second television signal and feeding a part of the video information utilized for the display in the second region to the data lines.

7. A liquid crystal displaying apparatus capable of displaying a first television signal having a first number of first scanning lines and a second television signal having a second number of second scanning lines, said second number being smaller than the first number, comprising:

a liquid crystal displaying means for forming pixels at respective intersections of a plurality of data lines and a plurality of scanning lines and having a number of pixels corresponding to the first television signal; and a liquid crystal driving means;

the liquid crystal driving means including:

a means for feeding scanning signals to the scanning lines of the respective pixels of a first region so as to form a display in the first region of the liquid crystal displaying means at the time of receiving the first television signal and feeding video information of the first television signal to the data lines;

a means for feeding scanning signals to the scanning lines of the respective pixels of the second region so as to form a display in the second region which is narrower than that in the first region at the time of receiving the second television signal and feeding the video information of the second television signal to the data lines; and a blank part displaying means for feeding the second scanning signal to the scanning lines of the respective pixels corresponding to a part of the difference between the first region and second region at the time of receiving the second television signal; feeding a part of video signals used in a display in the second region to the data lines; and displaying a specific video in the blank part corresponding to the part of the difference.

8. A liquid crystal displaying apparatus capable of displaying a first television signal having a first number of first scanning lines and a second television signal having a second number of second scanning lines, said second number being smaller than the first number, comprising:

a liquid crystal displaying means for forming pixels at respective intersections of a plurality of data lines and a plurality of scanning lines and having a number of pixels corresponding to the above mentioned first television signal; and a liquid crystal driving means;

the liquid crystal driving means including:

a means for feeding scanning signals to the scanning lines of the respective pixels of a first region so as to form a display in the first region of the liquid crystal displaying means at the time of receiving the first television signal and feeding video information of the first television signal to the data lines;

a means for feeding scanning signals to the scanning lines of the respective pixels of a second region so as to form a display in the second region which is narrower than that in the first region at the time of receiving the second television signal and feeding video information of the second television signal to the data lines; and a blank part displaying means for feeding a part of the scanning signals utilized for the display in the second region to the scanning lines of the respective pixels corresponding to the part of the difference between the first region and second region at the time of receiving the second television signal; feeding a part of video signals used in a display in the second region to the data lines; and displaying a specific video in the blank part corresponding to the part of the difference.

* * * * *